United States Patent
Lee (10) Patent No.: US 7,710,843 B2
(45) Date of Patent: May 4, 2010

(54) METHOD AND APPARATUS FOR SUPPORTING FAST FINALIZATION FOR A RECORDING MEDIUM

(75) Inventor: Jae Cheol Lee, Osan-si (KR)

(73) Assignee: LG Electronics Inc., Seoul (KR)

( * ) Notice: Subject to any disclaimer, the term of this patent is extended or adjusted under 35 U.S.C. 154(b) by 859 days.

(21) Appl. No.: 11/500,474

(22) Filed: Aug. 8, 2006

(65) Prior Publication Data

US 2007/0030782 A1   Feb. 8, 2007

(30) Foreign Application Priority Data

Aug. 8, 2005  (KR) .................. 10-2005-0072171

(51) Int. Cl.
*G11B 11/00* (2006.01)
(52) U.S. Cl. ..................... 369/53.24; 369/94
(58) Field of Classification Search ............ None
See application file for complete search history.

(56) References Cited

U.S. PATENT DOCUMENTS

| | | | |
|---|---|---|---|
| 5,978,336 A | * | 11/1999 | Mine et al. .......... 369/47.14 |
| 6,151,281 A | * | 11/2000 | Van Der Enden et al. ........ 369/30.11 |
| 6,243,338 B1 | | 6/2001 | Mine |
| 2005/0025015 A1 | * | 2/2005 | Horibata ............ 369/53.3 |

FOREIGN PATENT DOCUMENTS

| | | |
|---|---|---|
| CN | 1213124 A | 4/1999 |
| JP | 10-112166 A | 4/1998 |
| KR | 1998-032556 A | 7/1998 |

* cited by examiner

*Primary Examiner*—Paul Huber
(74) *Attorney, Agent, or Firm*—Birch, Stewart, Kolasch & Birch, LLP

(57) ABSTRACT

The present invention relates to a method and apparatus for finalizing a dual layer disc medium. The present invention checks whether particular areas on each recording layer of a dual layer recording medium separated from each other, e.g., the innermost circumference of data zone and around an area of radius 4 cm, are unrecorded and records null data in a particular area found to be unrecorded and carries out finalization. The present invention has an advantage in that time needed for finalization is considerably reduced compared with a traditional procedure of recording null data throughout the entire unrecorded data section.

20 Claims, 5 Drawing Sheets

METHOD AND APPARATUS FOR SUPPORTING FAST FINALIZATION FOR A RECORDING MEDIUM

BACKGROUND OF THE INVENTION

1. Field of the Invention

The present invention relates to a method and apparatus for finalizing a dual layer recording medium.

2. Background of the Related Art

As broadcast channels including terrestrial, cable, satellite TV, etc. are diversified, it is frequent that a user records a program to watch into a disc medium which is a digital recording medium by reserved recording and watches the program at his/her convenience. Since data bit rate becomes about 9.8 Mbps when broadcast signals are recorded in high video quality (HQ mode), a widely used recording medium such as DVD+/−R with recording capacity of 4.7 GByte can record a broadcast program lasting an hour or so (approximately 64 minutes).

However, since it is quite often the case that a broadcast program lasts more than 60 minutes and a user may want reserved recording of more than two broadcast programs in high video quality mode, the capacity of a recording medium as above may be regarded to be insufficient for high video quality recording of a broadcast program.

Recently, a dual layer disc medium has been developed and commercialized, where double recording layers are set up on one side of a disc medium so that the recording capacity should be significantly increased.

By the way, after a broadcast program having been recorded on a dual layer disc medium, the disc medium may be taken away from a recording apparatus used for recording the broadcast program and reproduced by a playback-only disc player. For example, after a broadcast program having been recorded on a recording medium through a recording apparatus installed in a living room, the broadcast program recorded on the recording medium can be reproduced by a playback-only disc player installed in a place other than the living room, e.g., a bedroom.

As mentioned above, in order for a playback-only disc player to be able to reproduce a disc medium where a broadcast program has been recorded by a recording apparatus, finalization must be carried out on a recordable disc medium. Finalization is an operation duplicating information located in PMA area into a lead-in area, where the information is used for managing respective recording sections recorded in a recordable disc medium by a recording apparatus as respective logical tracks, and recording data intended for signals of 2 kHz to be detected at the outer circumference of the last recording section, thereby creating a lead-out area. A playback-only disc player can reproduce a recordable disc medium finalized as described above.

A playback-only disc player, e.g., DVD player, before reproducing a loaded disc medium, focuses the beam of an optical pickup on an arbitrary point within a radius of 4 cm considering the possibility of insertion of a disc medium having a diameter of 8 cm and adjusts servo characteristics based on the characteristics of RF signals detected by the beam focusing. If RF signals are not detected and subsequent servo characteristics are not set up properly, playback of a loaded disc medium will not be made possible.

Figure 1:
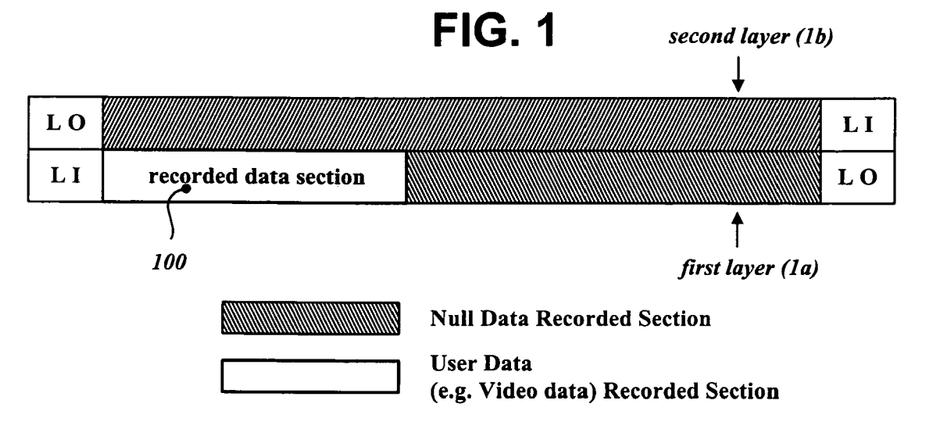
FIG. 1 illustrates a general method for finalizing an optical disc of double layers.

Therefore, in order to reproduce a recordable disc medium in a DVD player, the interior of the disc medium having a diameter of 8 cm must have arbitrary data recorded for RF signals to be detected other than left in blank state. As a consequence, upon the request from a user requiring finalization of a dual layer disc medium for reproduction in a DVD player, a recording apparatus of a disc medium, besides the finalization operation above, as shown in FIG. 1, carries out an operation of padding null data in double layers except for a recorded data section 100. In other words, as shown in FIG. 1, if finalization request is issued when only a part of a first recording layer 1a contains recorded data 100, the entire area 1b of a second recording layer is padded with null data. In the case of a single-layer disc medium, if data are not recorded up to a radius of 4 cm, null data are padded to the area of radius of 4 cm and finalization is completed.

Since the operation of padding null data is the same process as data recording operation, however, considerable time is needed in the case of a dual layer disc medium; as a data section in a recording layer of a disc medium recorded by a user's request becomes small, much more time is needed to complete finalization. Such a long time requirement needed for finalization imposes severe inconvenience on a user who wants to watch a recorded program in another playback apparatus.

SUMMARY OF THE INVENTION

The present invention is directed to provide a method and apparatus for selectively recording null data in a unrecorded data section in order for finalization operation on a dual layer disc medium to be carried out quickly.

To achieve the objective above, the present invention checks whether particular areas on each recording layer of a double layered recording medium separated from each other have a unrecorded data section and writes null data in the corresponding unrecorded data section of a particular area containing a unrecorded data section.

In one embodiment in accordance with the present invention, the particular areas consist of a first area and a second area, the first area being of a fixed width starting from the innermost circumference of data zone of the recording medium to an outer circumference and the second area being of a fixed width starting from a position of radius 4 cm to an inner circumference.

In one embodiment in accordance with the present invention, as for a first recording layer of the recording layers, null data are recorded so that no unrecorded data section should be found in the area ranging from the innermost circumference of data zone to a position of radius 4 cm.

In one embodiment in accordance with the present invention, the procedures of checking whether a unrecorded data section is contained in a particular area and recording null data according thereto are carried out upon finalization request from a user.

In one embodiment in accordance with the present invention, the requested finalization is carried out after recording null data in a unrecorded data section of the particular area.

In another embodiment in accordance with the present invention, the operation of recording null data in a unrecorded data section of the particular area is carried out after completing the requested finalization.

In another embodiment in accordance with the present invention, the procedure of recording null data in a unrecorded data section of the particular area is carried out in a waiting state where functional operations of a recording apparatus are not carried out.

In one embodiment in accordance with the present invention, after finalization, a guide message is provided to a user notifying that a finalized recording medium may not be reproduced in other playback-only disc players.

In one embodiment in accordance with the present invention, upon the request from a user, an operation of recording null data is carried out on the entire unrecorded data section, which is applied to a recording medium where null data are recorded only in the particular area.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF PREFERRED EMBODIMENTS

Hereinafter, according to the present invention, preferred embodiments of a method and apparatus for supporting fast finalization will be described in detail with reference to appended drawings.

Figure 2:
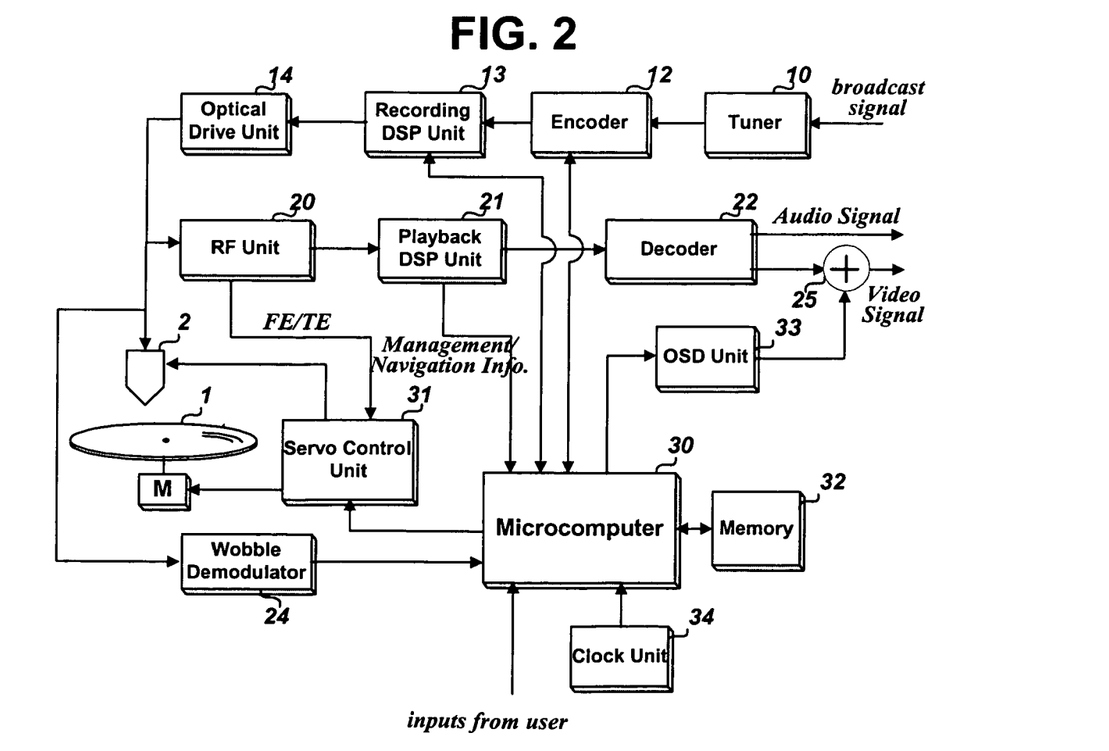
FIG. 2 illustrates the structure of an optical disc apparatus where a method for supporting fast finalization in accordance with the present invention is carried out.
Figure 3:
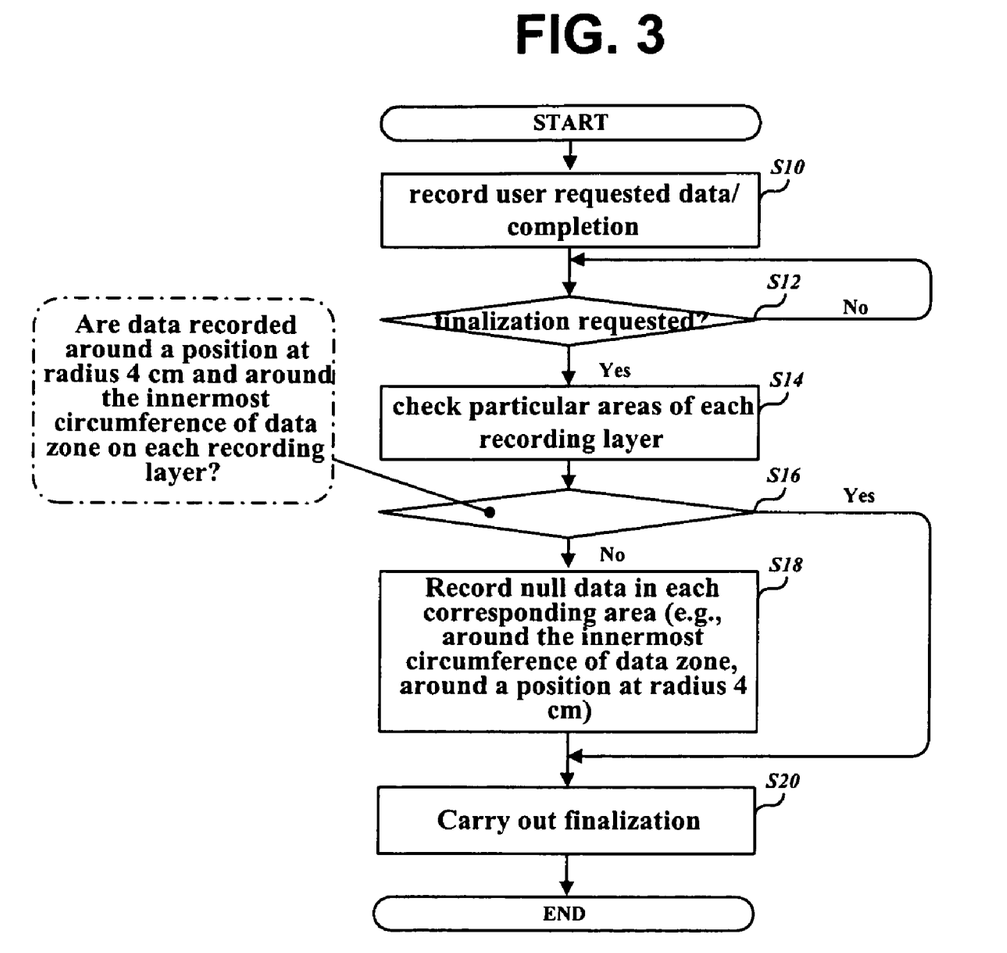
FIG. 3 illustrates a flow diagram of one embodiment of a method for supporting fast finalization in accordance with the present invention.

FIG. 2 illustrates the structure of one embodiment of a recording/playback apparatus of an optical disc recording medium, where a method for supporting fast finalization in accordance with the present invention is carried out and FIG. 3 illustrates a flow diagram of one embodiment of a method for supporting fast finalization in accordance with the present invention.

A recording/playback apparatus shown in FIG. 2 comprises a tuner 10 resonating at television broadcast signals, an encoder 12 converting the resonated video signals into digital signals and encoding the digital signals, e.g., in MPEG format and decomposing and muxing the encoded data into audio and video PES (Packetized Elementary Stream) packets, a recording DSP unit 13 configuring the PES packet sequence by ECC (Error Correction Code) block format and demodulating the configured PES packet sequence to signals for recording, an optical drive 14 feeding recording beam drive currents to an optical pickup 2 according to input signals, the optical pickup 2 reading out signals of an optical recording medium 1 such as DVD+R/–R or applying beams according to signals from the optical drive 14 to the optical recording medium 1, an RF unit 20 extracting electrical signals for binarized playback signals, focusing error (FE) signals, and tracking error (TE) signals from the read out signals, a wobble demodulator 24 decoding low frequency wobble signals according to track shapes from the read out signals, a playback DSP unit 21 reconstructing digital data from binarized playback signals and separating management data and navigation data from the reconstructed data, a decoder 22 separating audio and video PES packets from muxed PES packet sequence which is output data of the playback DSP unit 21 and decoding the separate audio and video PES packets into respective A/V signals, an OSD unit 33 generating character and graphic signals, a synthesizer 24 synthesizing the video signals and the character and graphic signals, a servo control unit 31 controlling the optical pickup 2 and the incident beams (which are used for recording and reproducing) according to the focusing error signals and tracking error signals and controlling a spindle motor M rotating the optical recording medium 1, memory 32 for storing data, a timer unit 34 tracking current data and time, and a microcomputer 30 processing user inputs and controlling operations of recording/playback as a whole. For the purpose of description of the present invention, an optical recording medium 1 of FIG. 2 is assumed to be a dual layer disc medium having a diameter of 12 cm.

Hereinafter, a procedure illustrated in FIG. 3, an exemplary embodiment of the present invention being carried out by an apparatus of FIG. 2, is described in detail.

When a user selects a reserved recording menu by using a user input means (not shown), e.g., an input apparatus such as a remote controller installed to the recording/playback apparatus of FIG. 2, the microcomputer 30 controls the OSD unit 33, thereby configuring and displaying a reserved recording menu. Reception of a remote controller's signals is accomplished through a well-known infrared receiving means (not shown), which is interpreted by the microcomputer 30. While a menu being displayed, the user sets a desired channel for reserved recording, recording time (start and end time including date), recording mode e.g., one from among HQ, SP, LP, EP, and SLP, and recording pattern by using key inputs on a remote controller. At this point, recording pattern can be of one-time, daily, or weekly basis.

When the user sets reservation items as above and selects 'completion', the microcomputer 30 registers the reserved items on a list of reserved recording in the memory 32. By the procedure above, programs desired by the user are all registered on a list of reserved recording in the memory 32. After the setting of reserved recording as above, the user usually let the operation power of the recording/playback apparatus turned off, thereby making the apparatus in waiting state.

The microcomputer 30 monitors whether current date/time tracked by the timer unit 34 in waiting state becomes recording start time of any one of the designated reserved recording items. When it becomes a start time, the microcomputer 30 controls the tuner 10 to resonate to a channel reserved for recording.

Accordingly, video signals received from a resonated channel are encoded in MPEG format by the encoder 12 and configured into PES packets. The packet sequence is then configured into ECC block format for error correction by the recording DSP unit 13 and demodulated into recording signals, thereby being recorded along physical tracks starting from an inner circumference of a first recording layer of the disc 1. In other words, recording of a broadcast program belonging to reserved recording items is started. During recording, if current time of the timer unit 34 reaches recording end time, recording is terminated S10 and information about sections recorded so far is recorded in the PMA area of the loaded disc medium 1 as a single logical track.

Although the description above is related to a method for recording reserved recording items, when a user requests an immediate recording while watching a channel resonated by the user, the aforementioned process of recording from an inner circumference of a first recording layer of a dual layer disc medium 1 is carried out until the user request to stop recording S10; upon receiving a request to stop recording, information about a recorded section is recorded in PMA.

After recording as above, however, writing complete information about a lead-in area has not been accomplished yet, but with information about a currently recorded video segment being recorded in PMA as a single logical track. At the same time, a lead-out area for additional data recording by the user has not been created. Therefore, under the condition above, although a recording apparatus of a disc medium can record additional data subsequent to a recorded section with reference to the information of PMA on a disc medium 1 or reproduce recorded data, a playback-only disc player cannot read recorded data.

Therefore, when the user requests finalization of a dual layer disc medium 1 in order to watch a program recorded in a disc medium by using a playback-only disc player other than a current recording apparatus S12, the microcomputer 30 makes reference to PMA information of each layer of the disc medium 1 and checks whether data are present in a designated area of each recording layer, e.g., in the innermost circumference of data zone and around a region of diameter 8 cm S14. Designated example areas, namely, the innermost circumference of data zone and a region around the circumference of radius 4 cm, are those of highest probability that a playback-only disc player will move an optical pickup to disc surface for adjusting servo characteristics. A unrecorded data section can be checked with reference to PMA information (in the case when a loaded disc is found to be a blank disc at the time of initial operations); alternatively, data recording in the designated areas can be checked according to whether EFM signals are detected by traversing the optical pickup 2 on each recording layer.

Figure 4A:
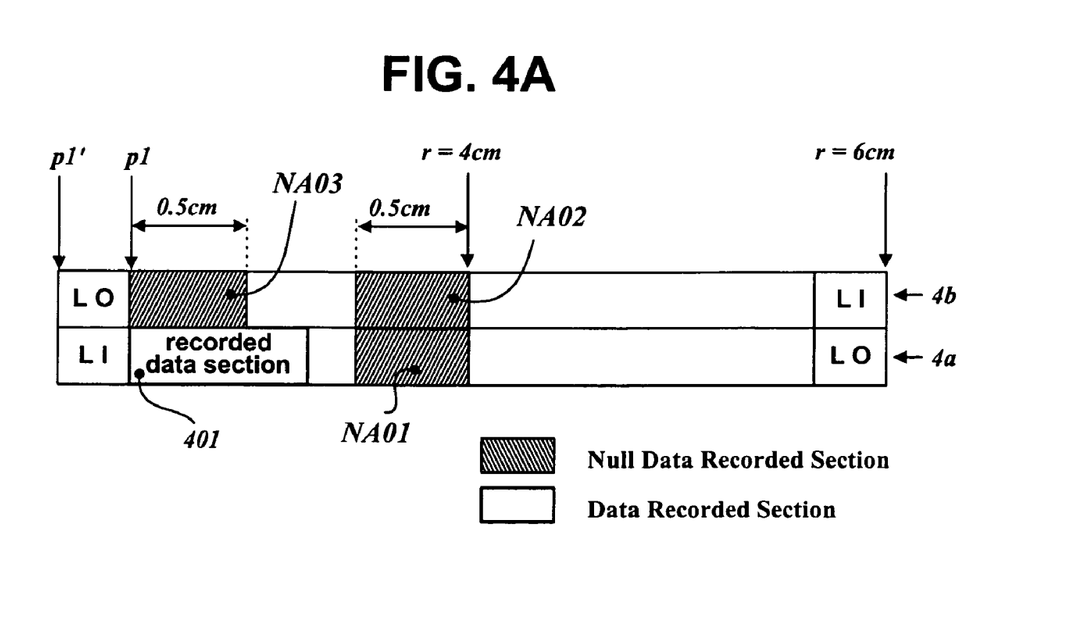
FIGS. 4A to 4E respectively illustrate cases where null data are recorded in a particular area of an optical disc of double layers in accordance with one embodiment of the present invention.

If all of checked areas are found to have recorded data S16, finalization is carried out immediately S20. On the other hand, as shown in FIG. 4A, when data are recorded only in a first recording layer 4a and the recorded area ranges from the innermost circumference of data zone to a circumference of radius, e.g., shorter than 3.5 cm, the microcomputer 30 moves the optical pickup 2 to a position of radius 3.5 cm by using the servo control unit 31. At this point, a position of radius 3.5 cm is only an example; an arbitrary position within the range of radius 4 cm (if possible, a position beyond the range of radius 3 cm) can be used as a reference. Subsequently, the microcomputer 30 feeds null data into the recording DSP unit 13 and makes null data recorded along physical tracks from the position. The operation of recording null data is continued up to the circumference of radius 4 cm S14. That is to say, null data are recorded in NA01 area of FIG. 4A. Meanwhile, the microcomputer 30 identifies the radius of a current position based on address information recorded after demodulation in wobble structure of a track, which is provided from the wobble demodulator 24. Another method commonly known for identifying the radius of a current beam on a disc medium can also be utilized.

When the above operation is finished, the microcomputer 30 moves the beam of the optical pickup 2 to the outermost circumference, at which the microcomputer 30 focuses the beam on a second recording layer 4b. The microcomputer 30 again moves the beam to a position of radius 4 cm on the second recording layer and again records null data from the position to a region of radius shorter than 4 cm, e.g., 3.5 cm. When recording null data in the area NA02 is finished, the microcomputer 30 again moves the optical pickup 2 to a position separated from the outermost circumference p1 of data zone by, e.g., 0.5 cm (or a position separated from an inner reference p1' of a position for recording lead-out by 0.5 cm) and records null data from the position to the innermost circumference p1, S18. That is to say, null data are recorded in NA03 area of FIG. 4A.

After completion of the operation of recording null data as above, the microcomputer 30 carries out a commonly known finalization operation such as completing information about a lead-in (LI) area based on information recorded in PMA and forming a lead-out (LO) area S20.

Figure 4B:
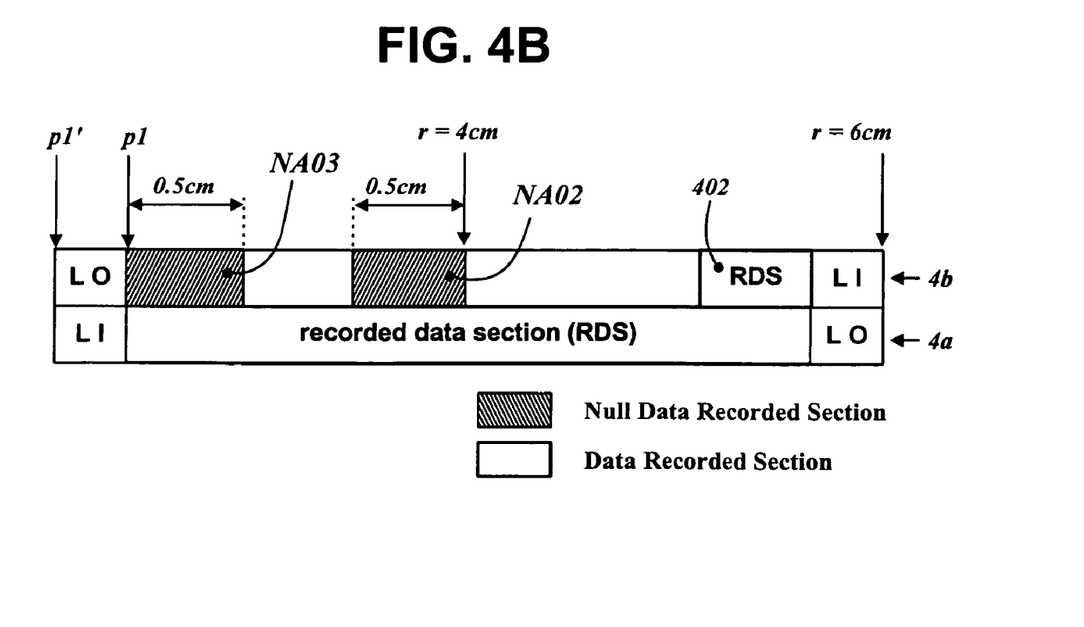
Figure 4C:
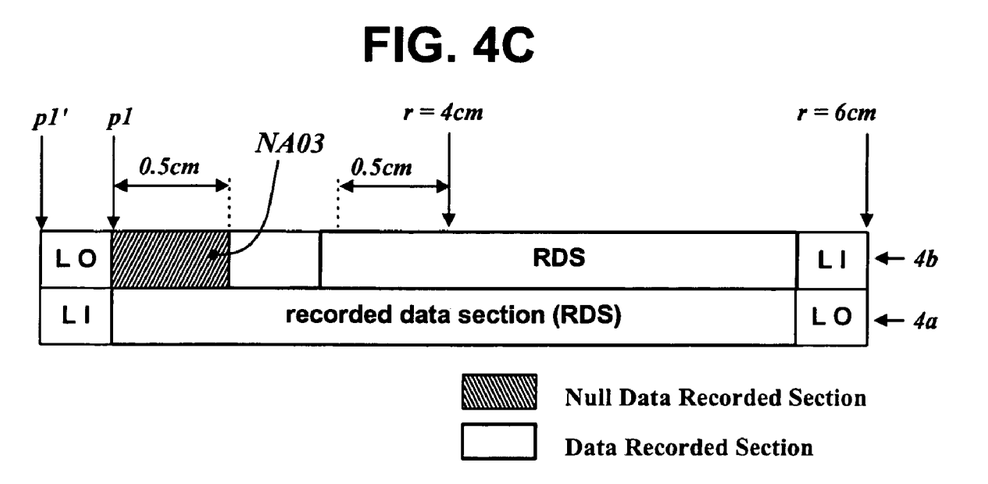
Figure 4D:
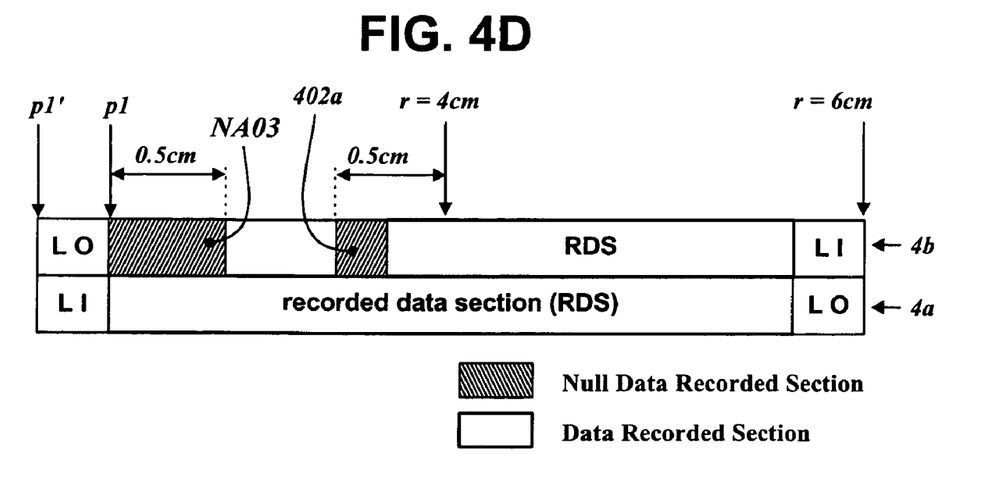

As shown in FIG. 4B, if a loaded dual layer disc medium 1 has data recorded throughout the first recording layer 4a, whereas data are recorded only in a partial area 402 ranging from the outermost circumference of the second recording layer 4b to a position of radius shorter than 4 cm, null data are recorded in NA02 area (as shown in FIG. 4A, which is an area ranging from a position of radius 4 cm to an inward position of radius, e.g., 0.5 cm) and NA03 area (as shown in FIG. 4A, which is an area ranging from the innermost circumference p1 of data zone or an inner reference p1' of a position for recording lead-out to an inward position of radius, e.g., 0.5 cm) of the second recording layer 4b. As shown in FIG. 4C, if user data are recorded up to NA02 area of the second recording layer 4b, null data are recorded only in NA03 area of the innermost annulus of data zone. At this time, as shown in FIG. 4D, if user data are not recorded throughout the NA02 area, null data are recorded in the remaining area 402a.

Figure 4E:
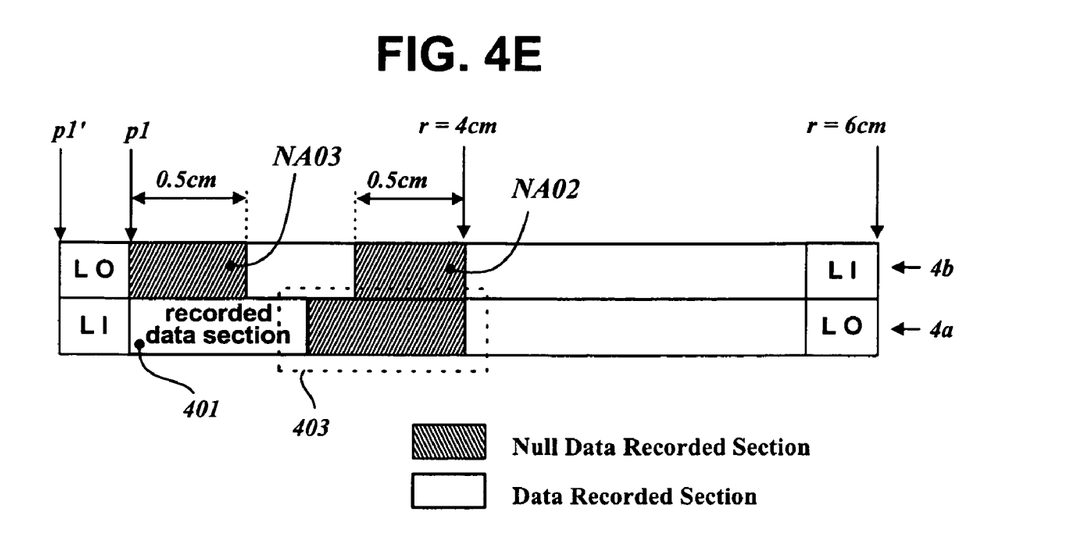

In the embodiment as described above, as to a first recording layer 4a, in the case of recording null data around a region of radius 4 cm of the recording layer, null data can not only be recorded in a section of a fixed width as shown in FIG. 4A but also be recorded up to a position of radius 4 cm 403 subsequent to a recorded data section 401 as shown in FIG. 4E.

In the description of previous embodiments, the width of an area for recording null data was assumed to be 0.5 cm; however, an area of narrower or wider width than the assumed one can also be used for recording null data.

In another embodiment of the present invention, finalization is not carried out after recording null data; on the contrary, finalization is first carried out and as described above, an operation of recording null data can subsequently be carried out in accordance with the distribution of recorded data on a disc medium.

In a further embodiment of the present invention, when the microcomputer 30 stays in a ready state (e.g., in a waiting mode while reserved recording being set up), where various functional operations of the corresponding apparatus such as data recording, playback of recorded data, temporary pause during recording or playback, and ejection of a disc medium happen with a low probability, null data can be recorded prior to the request of finalization in unrecorded data sections from among target areas designated previously (e.g., NA01, NA02, and NA03 in FIG. 4A; or an area of radius 4 cm in the innermost annulus of data zone of a first recording layer, NA02, and NA03 in FIG. 4E).

Figure 5:
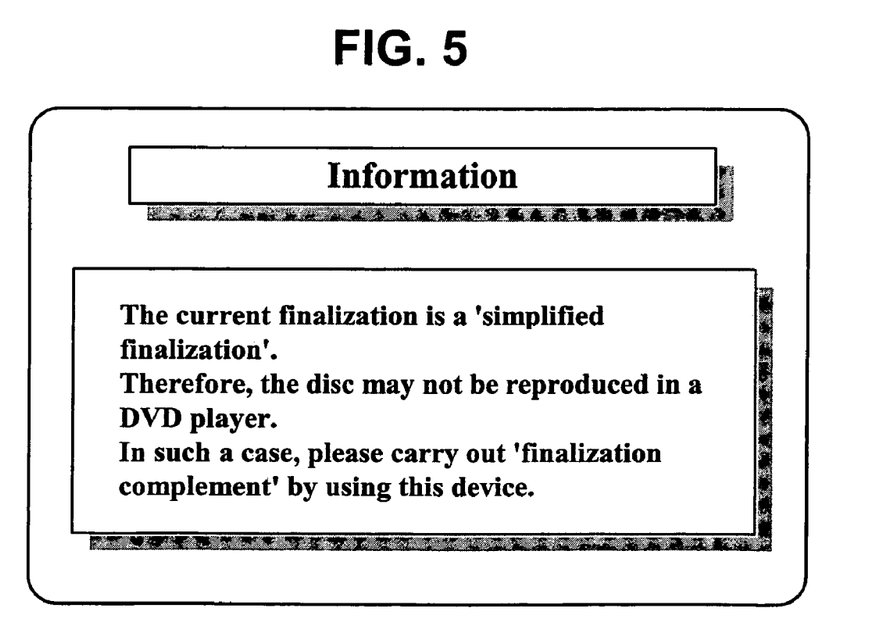
FIG. 5 illustrates an exemplary guide screen in accordance with the present invention displaying a message for a user that complementary recording may be needed after finalization.

After completing the operation of finalization subsequent to recording null data to selected sections of unrecorded data areas as described above or after recording null data in selected areas of unrecorded data sections subsequent to finalization, the microcomputer 30 can carry out a special guide operation for a user. For example, as shown in FIG. 5, by using the OSD unit 33, a guide message of "The current finalization is a 'simplified finalization'. Therefore, the disc may not be reproduced in a DVD player. In such a case, please carry out 'finalization complement' by using this device." can be displayed on the screen.

While inserted is a dual layer disc medium where finalization has been completed as above or by another recording apparatus, 'finalization complement' is requested through a menu screen on a recording/playback apparatus of FIG. 2, the microcomputer 30, with reference to PMA information of each layer of a loaded dual layer disc medium or based on detection result of EFM signals, carries out an operation of recording null data throughout the entire unrecorded data section of each recording layer.

In accordance with the present invention described in detail above, when a unrecorded data section in a dual layer disc medium is large, time needed for recording null data is significantly reduced since a recording area for null data is relatively small compared with that of a traditional approach. Therefore, total time needed for finalizing a dual layer disc medium is reduced, which leads to reduction of waiting time of a user for disc withdrawal, thereby improving user convenience significantly.

The present invention is not limited to the foregoing description of preferred embodiments and those skilled in the art may easily understand that the invention and various embodiments can be utilized with improvements, modifications, substitutions, or additions within the scope of the invention. If the improvements, modifications, substitutions, or additions belong to the scope of the invention as defined by the following appended claims, the spirit should also be regarded to belong to the present invention.

What is claimed is:

1. A method for conducting finalization on a dual layer recording medium in a recording apparatus, the method comprising:
    checking whether particular areas on each recording layer of the recording medium include an unrecorded data section, the particular areas being separated from each other; and
    if at least one of the particular areas includes an unrecorded data section, recording null data on the at least one of the particular areas of the unrecorded section without recording null data in all areas of the unrecorded data section.

2. The method of claim 1, wherein the particular areas include a first area and a second area, the first area being a fixed width starting from an innermost circumference of a data zone of the recording medium toward an outer circumference, and the second area being a fixed width starting from a position at a radius of 4 cm toward an inner circumference of the recording medium.

3. The method of claim 2, wherein, for one recording layer of the recording layers, if an unrecorded data section exists between a recorded data section on the one recording layer and the second area, the recording step further records null data on the unrecorded data section for said one recording layer.

4. The method of claim 1, wherein the checking and the recording steps are conducted in a waiting state where functional operations of the recording apparatus are not executed.

5. The method of claim 1, wherein the checking and the recording steps are conducted upon request from a user for finalizing the recording medium.

6. The method of claim 5, further comprising:
    conducting the finalization of the recording medium before or after the null data recording.

7. The method of claim 6, further comprising:
    providing a guide message for a user notifying that data reproduction of the recording medium may not be carried out at a playback-only disc player due to the conducted finalization.

8. The method of claim 1, further comprising:
    upon a user request, recording null data on an entire unrecorded data section of each recording layer of the recording medium.

9. A method for conducting finalization on a dual layer recording medium in a recording apparatus, the method comprising:
    receiving a request for finalization on the recording medium; and
    recording null data on an unrecorded data section of particular areas on each recording layer of the recording medium without recording null data in all areas of the unrecorded data section, the particular areas being separated from each other.

10. The method of claim 9, wherein the particular areas include a first area and a second area, the first area being a fixed width starting from an innermost circumference of a data zone of the recording medium toward an outer circumference and the second area being a fixed width starting from a position at a radius of 4 cm toward an inner circumference of the recording medium.

11. The method of claim 9, further comprising:
    conducting the finalization on the recording medium before or after the recording step.

12. The method of claim 11, further comprising:
    providing a guide message for a user notifying that data reproduction of the recording medium may not be carried out at a playback-only disc player due to the conducted finalization.

13. An apparatus for recording data on a dual layer recording medium, the apparatus comprising:
    a recording unit configured to record input data on either of dual recording layers of the recording medium by using an optical recording unit;
    a playback unit configured to read signals recorded on the recording medium; and
    a control unit configured to check, based on the read signals, whether particular areas separated from each other on each recording layer of the recording medium have an unrecorded data section, and if at least one of the particular areas includes an unrecorded data section, controlling the recording unit to record null data on the at least one of the particular areas of the unrecorded section without recording null data in all areas of the unrecorded section.

14. The apparatus of claim 13, wherein the particular areas include a first area and a second area, the first area being a fixed width starting from an innermost circumference of data zone of the recording medium toward an outer circumference and the second area being a fixed width starting from a position at a radius of 4 cm toward an inner circumference.

15. The apparatus of claim 14, wherein, for one recording layer of the recording layers, if an unrecorded data section exists between a recorded data section on the one recording layer and the second area, the control unit further controls the recording unit to record null data on the unrecorded data section for said one recording layer.

16. The apparatus of claim 13, wherein the control unit is further configured to conduct the finalization on the recording medium by controlling the recording unit.

17. The apparatus of claim 16, wherein the control unit is further configured to provide a guide message for a user notifying that data reproduction of the recording medium may not be carried out at a playback-only disc player by the conducted finalization.

18. The apparatus of claim 13, wherein upon a user request, the control unit is further configured to record null data on an entire unrecorded data section of each recording layer of the recording medium.

19. An apparatus for recording data on a dual layer recording medium, the apparatus comprising:

a recording unit configured to record input data on either of dual recording layers of the recording medium by using an optical recording unit; and a control unit configured to control, upon a request for finalization on the recording medium, the recording unit to record null data on a unrecorded data section for particular areas on each recording layer of the recording medium without recording null data in all areas of the unrecorded data section, the particular areas being separated from each other.

20. The apparatus of claim 19, wherein the particular areas include a first area and a second area, the first area being a fixed width starting from an innermost circumference of a data zone of the recording medium toward an outer circumference and the second area being a fixed width starting from a position at a radius of 4 cm toward an inner circumference of the recording medium.

* * * * *